Feb. 9, 1937.     E. J. MELVIN     2,069,895
SIGNALING SYSTEM FOR VEHICLES
Filed Aug. 15, 1935
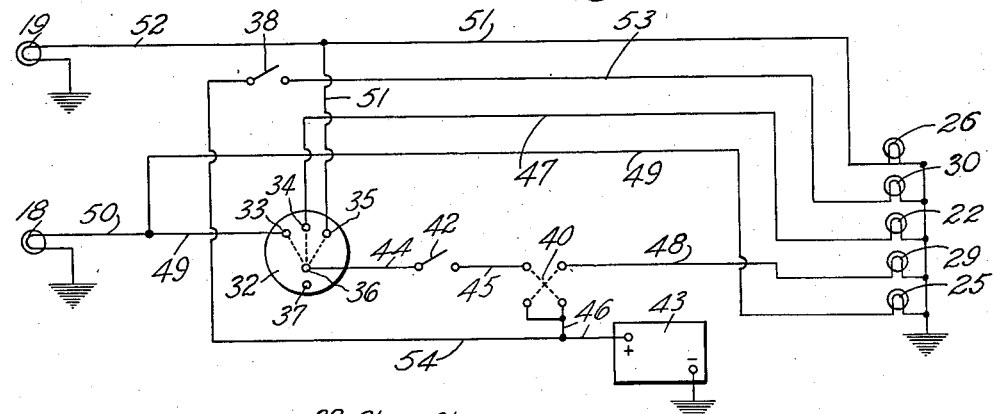
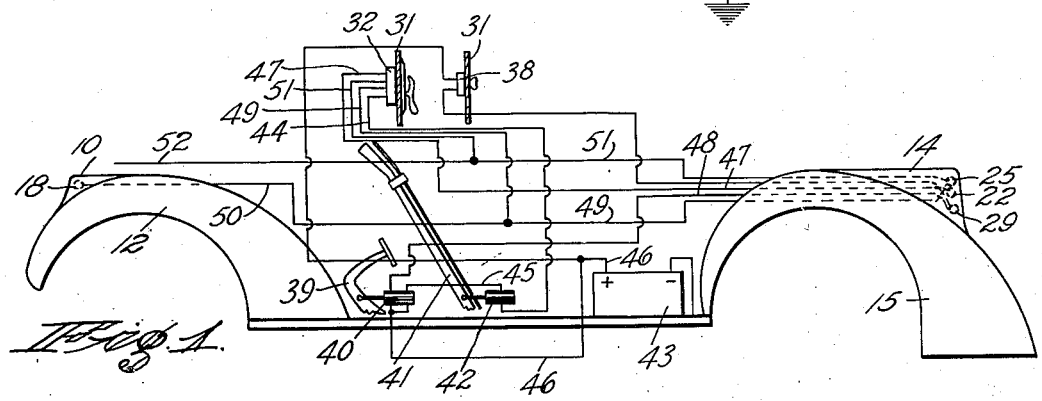
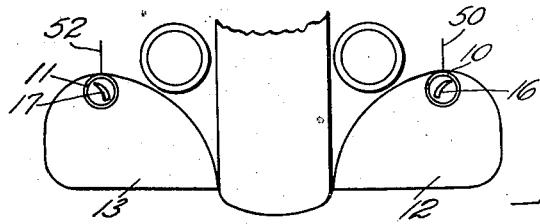
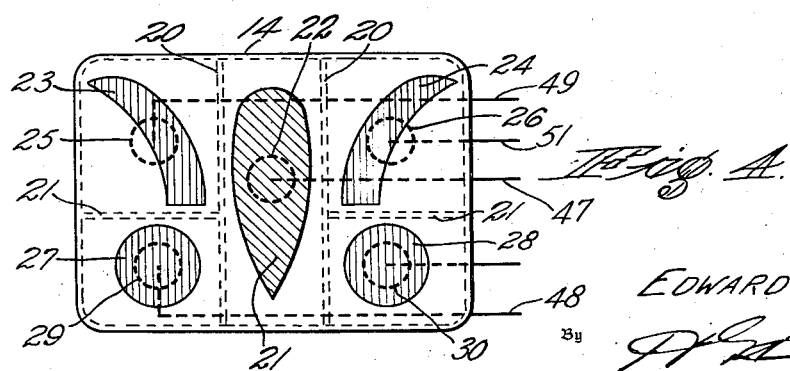
Inventor
EDWARD J. MELVIN
By
Attorney Patented Feb. 9, 1937

2,069,895

UNITED STATES PATENT OFFICE 2,069,895

SIGNALING SYSTEM FOR VEHICLES

Edward John Melvin, Hamilton, Ontario, Canada

Application August 15, 1935, Serial No. 36,251
In Canada February 13, 1935

1 Claim. (Cl. 177—339)

This invention relates to improvements in electric signaling systems for vehicles consisting of a novel combination of illuminated signals with objects as follows:

First, to provide a combined semi-automatically and semi-manually controlled system for visibly signaling to following traffic the intended course of the vehicle, the intention to pause or decelerate or to regularly proceed, and to indicate whether the vehicle is in motion or at rest.

Second, in conjunction with a system specified in the first object to provide manually controlled means for synchronously signaling the intended course of the vehicle to following traffic and to persons or traffic in the general area ahead of the position of the vehicle whose prospective movements would be influenced by a preindication of its proposed path.

Third, in conjunction with a system specified in the first object to provide manually set means as a constant or normal indication of the intent of the vehicle to pursue a straight ahead or regular course or to follow an obvious path (main route) though it may be curved.

Fourth, in conjunction with a system specified in the first object to provide automatic means for synchronously de-energizing or interrupting the constancy of the signal mentioned in the third object with and during the manually controlled energization of the signals denoting intent to turn or deviate in either direction from the main path.

Fifth, in conjunction with a system specified in the first object to provide means for automatically reversing the signals denoting pursuance of a regular course and intent to pause or decelerate controlled by the position of the service brake or other device incident to the speed control of the vehicle.

Sixth, in conjunction with a system specified in the first object to provide means for automatically de-energizing all signals incident to the operation of the vehicle controlled by the setting of the vehicle against motion.

Seventh, in conjunction with a system specified in the first object to provide independent manually controlled means for indicating a motionless state of the vehicle.

Eighth, to provide a system of the class specified which will be simple, effective, and inexpensive to produce.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a side elevation of a portion of an automobile including the fenders and running board and other apparatus incident to the present invention, showing the improved signaling system in schematic diagram;

Figure 2 is a true electrical diagram of a signaling system as constructed in accordance with this invention;

Figure 3 is a front elevation of a portion of an automobile illustrating the fore signal box; and Figure 4 is a rear elevation of the after or rear signal box.

In their present embodiment the signals consist of the left and right fore signal boxes 10 and 11, respectively, mounted, as for example, on the respective front fenders 12 and 13; and of the after signal box 14 mounted, as for example, on the left rear fender 15. In the fore signal boxes are openings formed in representation of curves terminating outwardly in points suggestive of direction, but it is understood that for this formation may be substituted other characters such as arrows or characteristic inscription. The openings are closed by suitable transparent or translucent plates 16 and 17, respectively, secured in any approved manner and preferably colored red. Located in the left box 10 in such a position that its rays are directed through the opening 16 is an incandescent lamp 18, and similarly in the right box 11 is a lamp 19.

The after signal box 14 is divided into compartments by means of vertical partitions 20 and horizontal partitions 21. In the portion of the face plate of the box 14 lying over the central compartment which is separated from the others by the vertical partitions is a vertically elongated opening closed by a transparent or translucent plate 21', and located behind this plate is an incandescent lamp 22.

In the opaque face plate over the upper corner compartments are formed openings similar and corresponding to those in the fore signal boxes, and these openings are closed by transparent or translucent plates 23 and 24 behind which are mounted incandesent lamps 25 and 26, respectively. In the face plate over the lower corner compartments are round openings closed by transparent or translucent plates 27 and 28, respectively, and behind plate 27 is an incandescent lamp 29 and similarly behind plate 28 is an incandescent lamp 30. The plates 23 and 24 are preferably colored red as indicative of danger, and the plates 27 and 28 are similarly colored, while the plate 21 is contrastingly colored, preferably green, as indicated.

Suitably and conveniently located in reach of the vehicle operator, such as on the instrument board 31 is a fourway manually operated selector switch 32 having poles 33, 34, 35, 36 and "off" position 37, and similarly mounted is a manually operated single pole switch 38.

Connected to the service brake represented by the convention pedal 39 is an automatically operated reversing switch 40, and connected to the emergency brake represented by the lever 41 is an automatically controlled single pole switch 42. Represented by 43 is a storage battery which may be the regular vehicle service battery.

The pole 36, which is selectively connective separately with either of the poles 33, 34, and 35, is connected through to the positive pole of the battery through the switches 42 and 40 by means of the conductors 44, 45, and 46. The pole 34 is connected to the lamp 22 by means of the conductor 47, and the reversing switch is connected to the lamp 29 by means of the conductor 48. When the service brake 39 is released the reversing switch 40 is in the position to transmit current through to the pole 36, assuming that the switch 42 is in normal closed position as when the emergency brake is released, but when the service brake is applied the position of the switch 40 is reversed so that the current is transmitted to the lamp 29.

The pole 33 is connected to the lamp 25 by means of the conductor 49, and in the same circuit is the lamp 18 which is connected to the conductor 49 by means of the conductor 50. The pole 35 is connected to the lamp 26 by means of the conductor 51, and in the circuit is the lamp 19 which is connected to the conductor 51 by means of the conductor 52.

With the switch 32 set to carry the current from the pole 36 to the pole 34, assuming that both brakes are released, the lamp 22 will be energized and observed as a vertically elongated green light at the rear of the vehicle whereby the intent to pursue a straight or regular course is indicated to following traffic. When the vehicle is about to be turned to the left the switch 32 is thrown to the pole 33, which, it will be observed, is to the left of the pole 34 so as to coincide with the direction to be taken, whereby the lamps 18 and 25 are energized and the lamp 22 de-energized. Similarly when the vehicle is to make a right turn the switch is thrown to the pole 35, at the right of the pole 34, whereby the lamps 19 and 26 are energized and the lamp 22 de-energized. Thus it is evident that the intended direction of the vehicle is signaled both in advance of and to the rear thereof.

On application of the service brake 39 the switch 40 is reversed so that the current is diverted through the conductor 48 to energize the lamp 29. This lamp is what is usually termed a "stop light", and automatically indicates to following traffic that the vehicle is about to either decelerate or stop. Obviously when the lamp 29 is energized which ever one of the lamps 22, 25 or 26 had been previously functioning is automatically extinguished, and consequently the intent to slacken speed or to stop is emphasized thereby. It is evident that when the service brake is released the order of energization automatically reverts.

When a vehicle is brought to a halt it is customary to set the emergency or hand brake against accidental movement from its stationary position. In setting the emergency brake the switch 42 is automatically opened with the result that all lamps are extinguished without the necessity of turning the switch 32 to "off" position.

This signaling system is adapted for twenty-four hour service, all the lamps thus far mentioned having current consumption comparative to the lamp in a conventional "stop light", and their brilliancy may be promoted by the use of reflectors, as is well known in the art, in order that the signals may be observed readily in daylight.

The lamp 30, which may be of lower current consumption than the other lamps, is for parking purposes at night time, that is to merely show the presence of a vehicle and that such vehicle is at a stand-still. This parking lamp is connected direct to the battery through the manually operated switch 38 by means of the conductors 53, 54 and 46. It may be turned on and off at will by closing or opening the switch 38.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

In a signaling system for automobiles, a pair of front direction signal lamps, a tail light bank including a warning lamp, a right direction lamp, a left direction lamp, and a stop lamp, said bank of lamps being grounded in multiple to the automobile, the said right direction lamp being conductively connected to the right front direction signal lamp, the said left direction lamp being conductively connected to the left front direction signal lamp, a battery and battery circuit, a brake pedal operated reversing switch, a three-point pivot switch, an emergency brake operated switch conductively connected to the pivot of the three-point switch, said reversing switch conductively connecting the stop lamp in the battery circuit in one position and conductively connecting the emergency brake operated switch with the battery circuit in the other position, a conductive connection from one point of the three-point switch to the connection between the left front direction signal lamp and the left direction lamp at the rear of the machine, a conductive connection between a second point of the three-point switch and the connection between the right front direction signal lamp and the right direction lamp at the rear of the machine, and a conductive connection between the third point of the three-point switch and the warning lamp.

EDWARD JOHN MELVIN.